United States Patent [19]
Andrews

[11] Patent Number: 6,150,802
[45] Date of Patent: Nov. 21, 2000

[54] ADJUSTABLE VOLTAGE CONTROLLED DC TO DC SWITCHER CURRENT SOURCE

[75] Inventor: Michael Andrews, Fort Collins, Colo.

[73] Assignee: Hewlett-Packard Company, Palo Alto, Calif.

[21] Appl. No.: 09/143,477

[22] Filed: Aug. 28, 1998

[51] Int. Cl.[7] ............................ G05F 1/40; H02M 3/335
[52] U.S. Cl. .............................................. 323/282; 363/21
[58] Field of Search .................................. 323/282, 285, 323/284, 222, 288; 363/65, 40, 39, 21

[56] References Cited

U.S. PATENT DOCUMENTS

| | | | |
|---|---|---|---|
| 4,257,090 | 3/1981 | Kroger et al. | 363/65 |
| 4,924,170 | 5/1990 | Henze | 323/272 |
| 5,483,151 | 1/1996 | Yamashita | 323/312 |
| 5,804,950 | 9/1998 | Hwang et al. | 323/222 |
| 5,804,957 | 9/1998 | Coln | 323/282 |

*Primary Examiner*—Peter S. Wong
*Assistant Examiner*—Rajnikant D. Patel

[57] ABSTRACT

An adjustable voltage controlled current source for supplying a constant current to a load may comprise a DC to DC switcher in a commonly known topology, including boost, buck, or boost/buck. The current from the DC to DC switcher is measured with one or more current sensing resistors or one or more inductively coupled current sensing windings such as a transformer or Hall-effect device. The current measurement is then coupled to the feedback input of the DC to DC switcher. The current measurement may have a DC bias added to meet the feedback voltage requirements of the DC to DC switcher. An external current set point may be combined with the current measurement to externally set the current output.

19 Claims, 5 Drawing Sheets

ADJUSTABLE VOLTAGE CONTROLLED DC TO DC SWITCHER CURRENT SOURCE

FIELD OF THE INVENTION

The present invention relates generally to the field of constant current supplies, and more particularly, to a system and method for employing a voltage controlled DC to DC switcher to supply a constant current.

BACKGROUND OF THE INVENTION

Many analog and digital circuits require multiple voltage or current levels to operate a system. Portable systems are often limited to using batteries to supply power, with the limitation that batteries each only supply one voltage level. DC to DC switchers are then employed to generate the remaining voltage levels.

DC to DC switchers are often the preferred solution over voltage or current regulators because switcher efficiencies exceed regulator efficiencies by a considerable margin. However, switchers do not operate as constant current sources.

DC to DC switchers may comprise an integrated circuit (IC) and associated external electronic components to operate as a power supply, such as a switching transistor, resistors, inductors and capacitors. The switching integrated circuit causes the switching transistor to rapidly open and close, allowing current to flow through the components at the appropriate amounts in order to charge an output capacitor or other component which supplies a constant voltage to a load. There are several common topologies, or configurations, for the external components normally associated with a DC to DC switcher, such as boost, buck, or buck-boost. These common topologies each have advantages for different applications of the power supply, but each operates as a constant voltage source.

DC to DC switchers maintain a constant output voltage by monitoring the output voltage and adjusting the switching transistor "ON" time to keep the output capacitor fully charged under varying load conditions. The switching transistor is switched on and off rapidly enough that the voltage level stored in the output capacitor appears to the load to remain at a constant level, much as a fluorescent light turns on and off rapidly enough that it appears to be at a constant light level to the eye. The switching transistor can be adjusted to remain on a large percentage of the time to supply a higher output voltage or a small percentage of the time to supply a lower output voltage. The DC to DC switcher employs a feedback mechanism which monitors the output voltage, generally via a resistor divider network, which allows the DC to DC switcher to detect whether the output voltage needs to be boosted or allowed to fall. This voltage fed back into the DC to DC switcher from the output is called a feedback voltage, and is generally required to be set at 1.2 to 1.5 volts depending on a reference voltage value set internally by the device manufacturer. The feedback voltage can be fixed at the required level using the resistor divider to cut the desired output voltage down to the required feedback voltage level.

This feedback mechanism does not support current control, as it is designed to monitor a voltage and requires a voltage level as the feedback input to the DC to DC switcher.

A need therefore exists for a comprehensive system and method enabling a power supply based on a DC to DC switcher to employ a feedback mechanism enabling control of the output current in order to supply a constant current.

A further need exists to provide a system and method for supplying a constant current using a DC to DC switcher which may be employed in various switcher circuit topologies without significant change.

An additional need exists to provide a system and method for supplying a constant and/or controllably adjustable current using a DC to DC switcher with an external control signal to set the desired current level, wherein the external control signal may be either a DC signal or a pulse width modulated (PWM) signal.

SUMMARY

To assist in achieving the aforementioned needs, the inventor has devised a system and method for using a DC to DC switcher to supply a constant current. An adjustable voltage controlled current source for supplying a constant current may comprise a DC to DC switcher in a commonly known topology, including boost, buck, or boost/buck. One or more current sensing resistors are used to measure the output current and feed it into the feedback input of the DC to DC switcher. Alternatively, the current may be measured with a current sensing winding, such as a transformer or a Hall-effect device, inductively coupled to the current output. The current measurement may have a DC bias added to meet the feedback voltage requirements of the DC to DC switcher. An external DC current set point may be combined with the current measurement to externally set the load current.

If the external current set point is pulse width modulated, an operational amplifier acting as an integrator may be used to convert the pulse width modulated signal to a DC signal.

These and other important features of embodiments of the invention will be further explained in, or will become apparent from, the accompanying description, drawings and claims.

BRIEF DESCRIPTION OF THE DRAWINGS

An illustrative and presently preferred embodiment of the invention is illustrated in the drawings, in which.

DESCRIPTION OF THE PREFERRED EMBODIMENT

As will be explained in greater detail below, a voltage controlled DC to DC switcher current source produces a constant current supply using a DC to DC switcher. A typical DC to DC switcher is used to supply a constant voltage, and may comprise a voltage controlled switching integrated circuit 662 (FIG. 6) and a switching transistor 674, along with several passive components such as an inductor 664, a resistor 684, a diode 670 and an output capacitor 676. The switching integrated circuit 680 causes the switching transistor 674 to switch on an off rapidly, allowing current to flow through the circuit to charge the inductor 664 and the output capacitor 676 which supply the output power. Operation of the DC to DC switcher circuit will be explained in greater detail below in association with the current control system.

There are many commonly known topologies, or configurations, for DC to DC switchers, such as boost, buck, or boost/buck. A topology is chosen for a DC to DC switcher based on the requirements of the power supply, as each has advantages and disadvantages associated with it, such as high or low output power, parts count, and reliability. However, before proceeding with the description, it should be noted that while the DC to DC switcher shown and described herein is in a boost topology, it is not limited to use with any particular topology. Indeed, the voltage controlled DC to DC switcher current source may be used with almost any topology imaginable. Consequently, the present invention should not be regarded as limited to the particular boost topology shown and described herein.

DC to DC switchers generally require a feedback voltage which enables the switcher to adjust the power output. The feedback voltage is device specific and is typically required to be at a specific nominal voltage level such as 1.2 volts or 1.5 volts. As the feedback voltage drops below the required feedback voltage, the DC to DC switcher increases the power output. As the feedback voltage rises above the required feedback voltage, the DC to DC switcher allows the power output to fall, in order to maintain the desired power output.

This feedback voltage system is designed to supply a constant voltage level at the output of the DC to DC switcher circuit, with the output voltage reduced to the required nominal feedback voltage in a voltage divider, or resister divider network. For constant voltage power supplies (the most common type of power supply), the voltage level produced by the power supply is kept constant by allowing the current to vary as the demands of the load change. When a constant current is desired, constant current power supplies produce the constant current by allowing the voltage to vary as the demands of the load change. However, although DC to DC switchers are preferable in many instance due to their efficiency in supplying power at a desired level, they only support constant voltage supplies due to their voltage feedback system. Disclosed herein is a system enabling a DC to DC switcher to provide a constant current.

Figure 1:
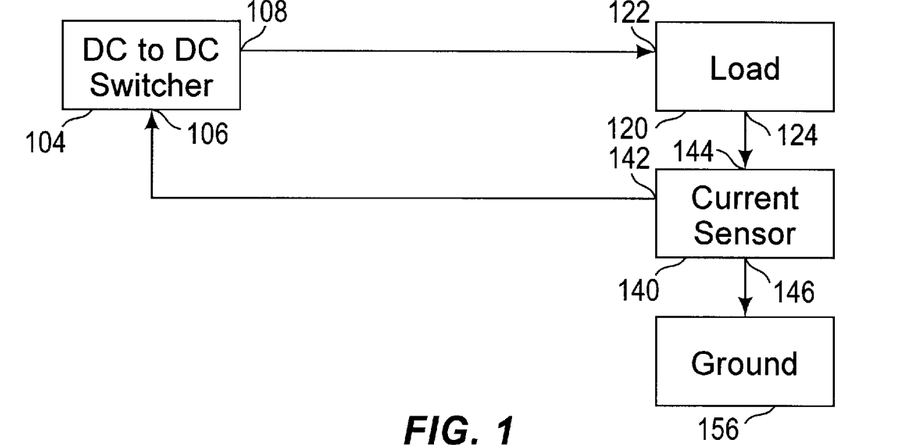
FIG. 1 is a block diagram illustrating a voltage controlled DC to DC switcher current source with a current sensor below the load.

Referring now to FIG. 1, in one embodiment a voltage controlled DC to DC switcher current source may comprise a DC to DC switcher 104 and a current sensor 140 which measures the current flowing from the DC to DC switcher 104 through a load 120 to a ground 156. The current is measured in the form of a voltage drop across a passive element of known impedance. According to Ohm's Law (I=V/R), current (I) can be measured by determining the amount of voltage (V) lost or dropped as the current flows through an element of known impedance (R).

A current sensor 140 having a known impedance is placed in the current path from the DC to DC switcher 104. Current flows from an output 108 of the DC to DC switcher 104 and into a load 120 which may comprise any device requiring a constant current, such as a light emitting diode (LED) or a motor. The current flows into an input 122 of the load 120 and back out an output 124 of the load 120. The current then flows into an input 144 of the current sensor 140 and back out an output 146, terminating at a ground 156. The voltage lost or dropped as the current flows through the current sensor 140 is indicated at a measurement output 142 of the current sensor 140 and transmitted to a feedback input 106 of the DC to DC switcher 104. Thus, the current level flowing through the circuit is converted to a voltage level as required by the feedback input 106 of the DC to DC switcher 104.

Figure 2:
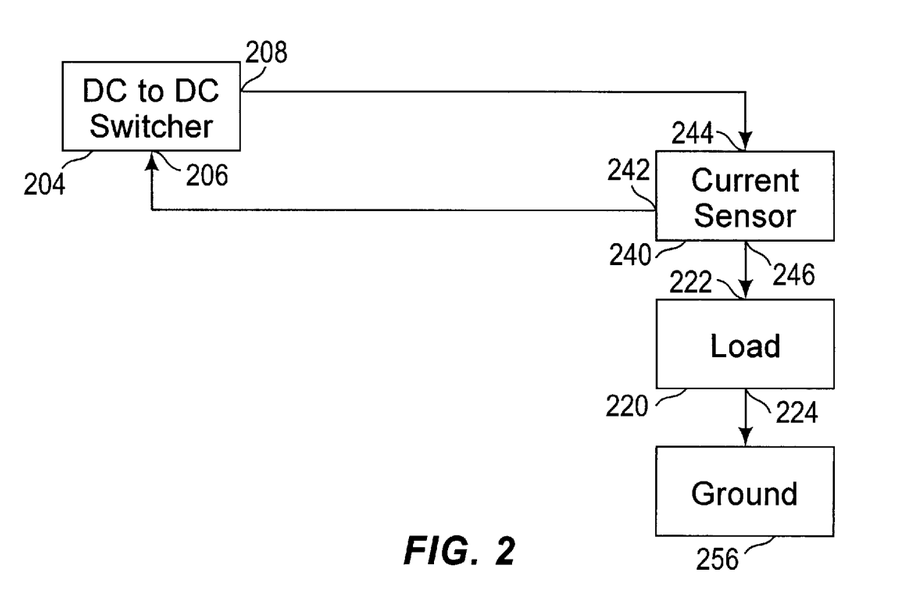
FIG. 2 is a block diagram illustrating a voltage controlled DC to DC switcher current source with the current sensor above the load.

Generally, though voltage drops when current flows through a load, current remains constant as it travels through a circuit. Therefore, as shown in FIG. 2, the current sensor 240 may be positioned in the current path ahead of the load 220. In this embodiment, current flows from an output 208 of the DC to DC switcher 204 into an input 244 of the current sensor 240, then back out an output 146 to an input 222 of the load 220. The current flows out of the load 220 through an output 224 and terminates at a ground 256. The voltage lost or dropped as the current flows through the current sensor 240 is indicated at a measurement output 242 of the current sensor 240 and transmitted to a feedback input 206 of the DC to DC switcher 204.

A current sensor (e.g., 140 and 240) may comprise any element which can couple to the current path and which has a known impedance. For example, the current sensor may comprise a precision low-value resistor (e.g., 688 FIG. 6) between the load and ground. In another embodiment, the current sensor may comprise a precision low-value resistor (e.g., 790 FIG. 7) and a differential amplifier (e.g., 792 FIG. 7) or other component for measuring the voltage drop across the resistor. When resistors are used, they are generally selected to have a low resistance value in order to have as little effect as possible on the current flow. Precision resistors having small error tolerances are preferable in order to accurately measure the current flowing through them.

Figure 8:
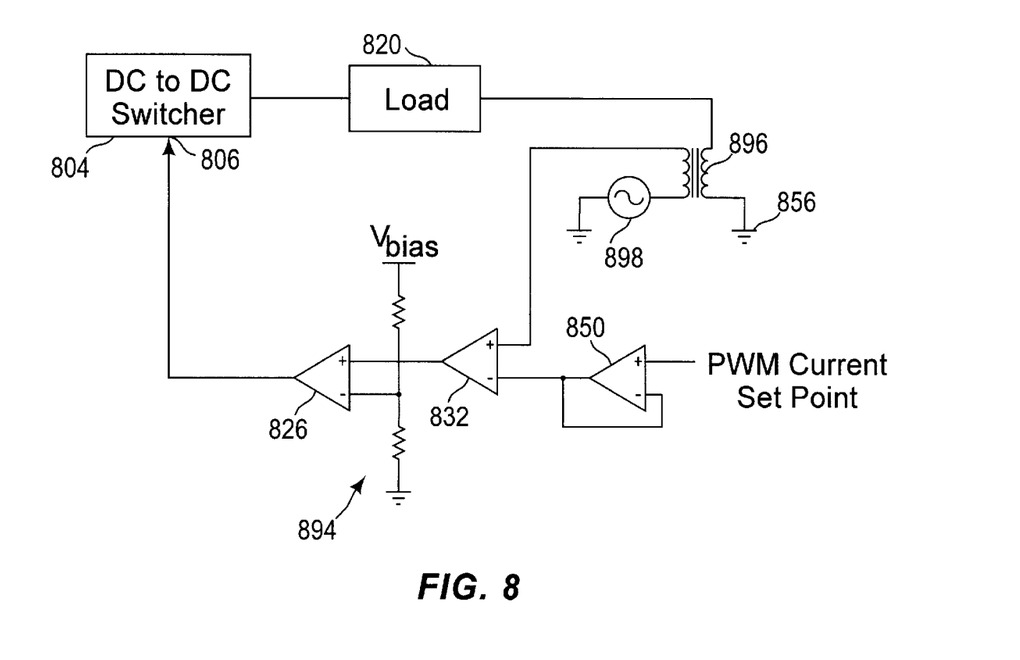
FIG. 8 is a schematic for an adjustable voltage controlled DC to DC switcher current source with an inductively coupled transformer sensing the load current.
Figure 9:
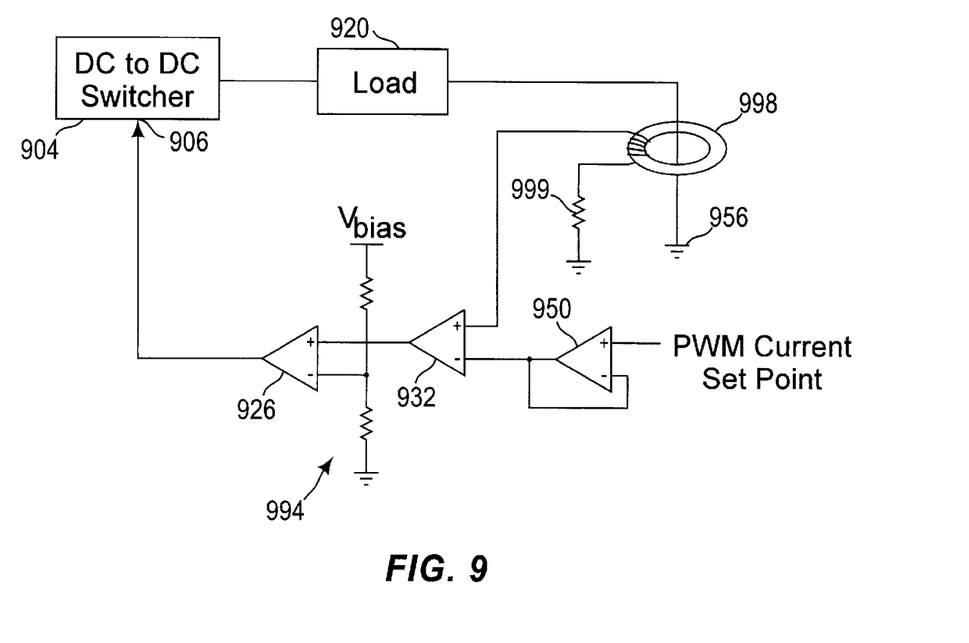
FIG. 9 is a schematic for an adjustable voltage controlled DC to DC switcher current source with a Hall-effect device sensing the load current.

Alternatively, a current sensor (e.g., 140 and 240) may comprise a current sensing winding such as a transformer (e.g., 896 FIG. 8) or Hall-effect device (e.g., 998 FIG. 9). These current sensing windings are not physically coupled to the current path, but are inductively coupled by positioning them adjacent the current path. When current flows from the DC to DC switcher through the current path, electromagnetic fields are generated around the current path, which induce a proportionate current in the adjacent current sensing winding. These embodiments have less effect on the current flowing through a load, but are more expensive and require more space.

While specific current sensing devices are described herein, it is important to note that any device suitable for measuring a current flowing through the load may be employed without deviating from the inventive concepts disclosed herein. Consequently, the present invention should not be regarded as limited to the specific current sensing devices disclosed herein.

Furthermore, the embodiments disclosed herein are closed loop control systems. Other control systems such as self adapting systems may also be employed without deviating from the inventive concepts disclosed herein.

Figure 3:
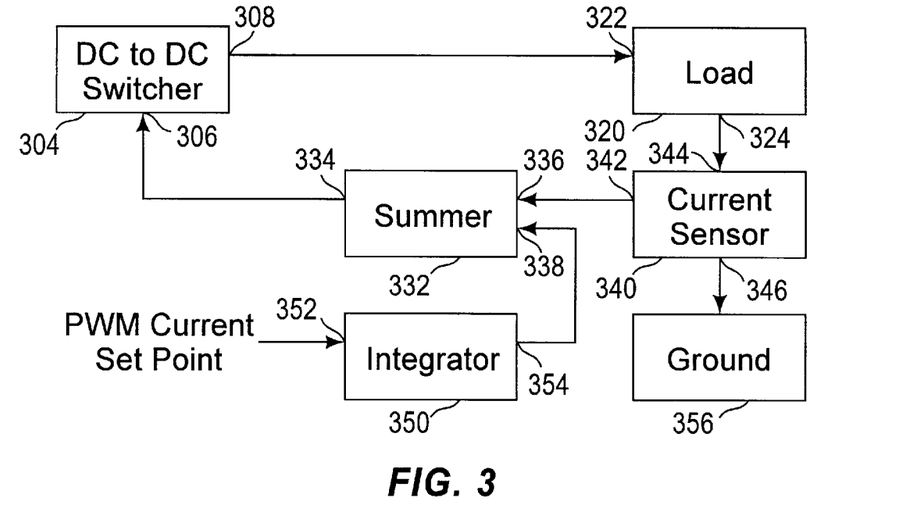
FIG. 3 is a block diagram illustrating an adjustable voltage controlled DC to DC switcher current source with a pulse width modulated current set point input.

Referring now to FIG. 3, an external current set point may be added to the current measurement from the current sensing device (340). It is often desirable to have the ability to externally adjust the current level from the DC to DC switcher 304. A DC signal may be combined with the current measurement using a summer device 332 whose output 334 is proportionate to the difference between the two inputs, the current measurement input 336 and the external current set point input 338. The difference between the voltages on the two inputs 336 and 338 constitutes the feedback signal, or error signal, which causes the DC to DC switcher to adjust the current output to correspond to the external current set point.

Those of ordinary skill in the art may design the summer 332 in many possible configurations. For example, in a simple configuration, the external current set point may set at a level equal to the desired current plus the nominal feedback level required by the switching integrated circuit. In this manner, the difference between the current measurement and the external set point will be at the required feedback level, causing the DC to DC switcher to stabilize the output current at the desired level. If the designer wishes to have the external current set point equal to the desired current, the difference from the summer 332 will need to be boosted from zero to the nominal feedback level required by the switching integrated circuit.

It is possible that the external current set point may not be a DC signal. If it is a pulse width modulated (PWM) signal, the external current set point signal may be converted to a DC signal in an integrator 350. A pulse width modulated signal is a series of pulses in which the voltage or current rapidly oscillates back and forth between a low level and a high level. The ratio of the width of the high level pulses compared with the width of the low level pulses determines whether the current output from the DC to DC switcher 304 should be increased or decreased.

The diagram in FIG. 3 illustrates an embodiment in which a PWM current set point is used to externally adjust the output current. The current flows from the output 308 of the DC to DC switcher 304 and through the input 322 to the output 324 of a load 320. The current then flows into the input 344 of a current sensor 340, out the output 346 of the current sensor 340, and terminates at a ground 356. The PWM external current set point signal flows into the input 352 of an integrator 350 which integrates the PWM signal into a DC current set point signal. The DC current set point leaves the output 354 of the integrator 350 and enters an input 338 of a summer 332 where it is combined with the current measurement signal which leaves the measurement output 342 of the current sensor 340 and enters a second input 336 of the summer 332. The summer 332 then calculates the difference between the two input signals 336 and 338 which is placed on the output 334 of the summer 332, then flows into the feedback input 306 of the DC to DC switcher 304 to adjust the output current.

Figure 4:
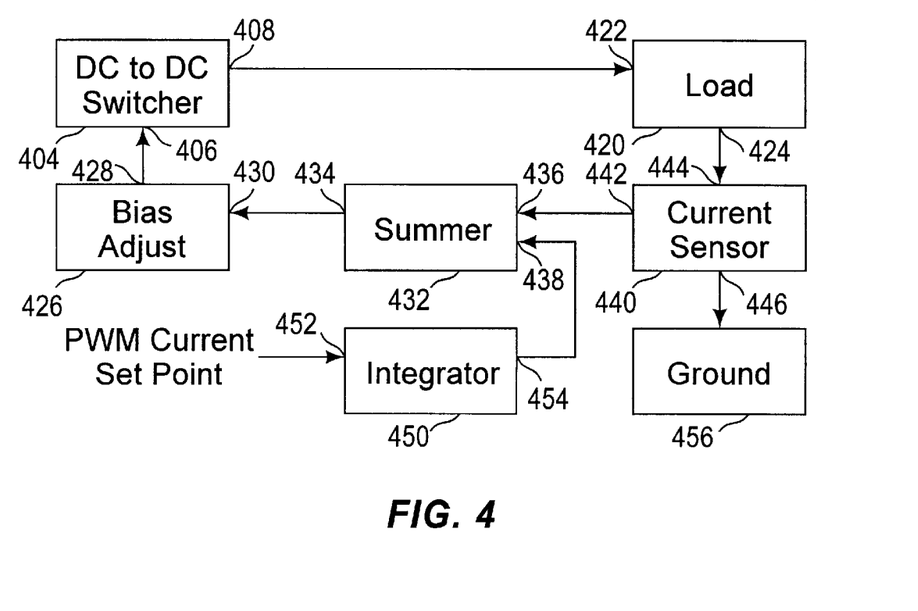
FIG. 4 is a block diagram illustrating an adjustable voltage controlled DC to DC switcher current source with a pulse width modulated current set point input and a bias adjust after the external current set point is added.
Figure 6:
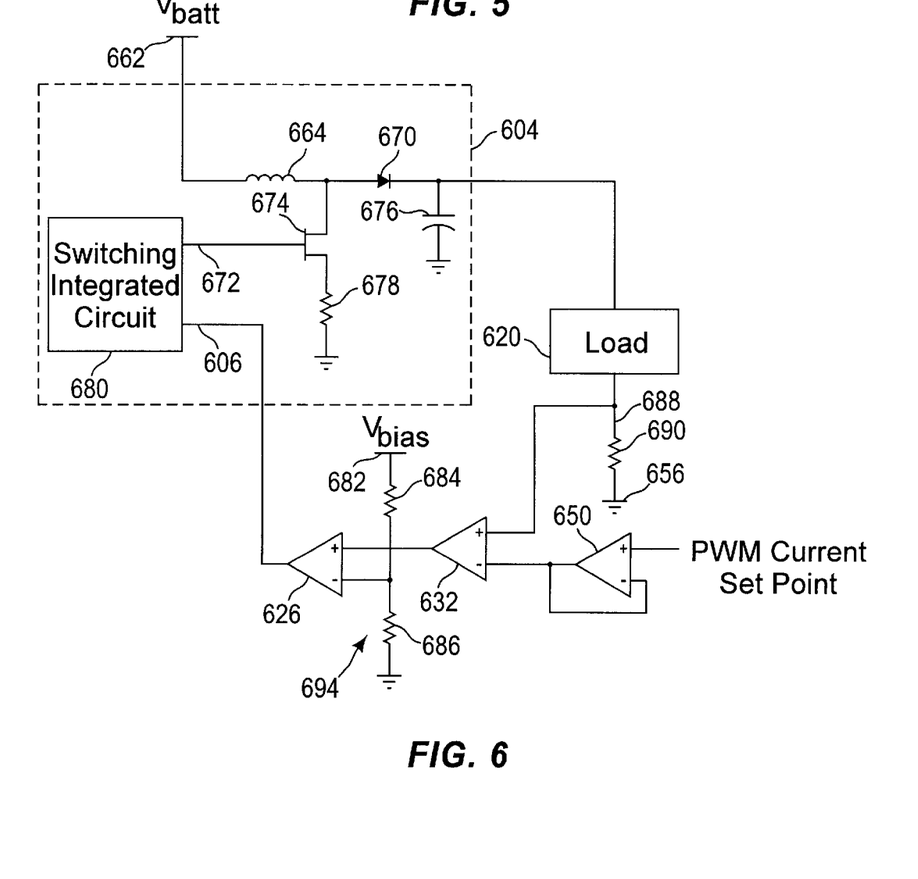
FIG. 6 is a schematic for an adjustable voltage controlled DC to DC switcher current source with a pulse width modulated current set point input and a bias adjust after the external current set point is added.

The required nominal feedback voltage of the switching integrated circuit (e.g., 680) in the DC to DC switcher (e.g., 404) may be produced by various methods. For example, as discussed above, the external current set point may be set so that the summer (e.g., 432) produces the required nominal feedback voltage.

In another embodiment, the impedance of the current sensing device (e.g., 140 and 240) may be selected so that the voltage drop across it as a result of the desired constant current level corresponds to the required nominal feedback voltage of the switching integrated circuit (e.g., 680). However, this may require the use of a current sensing device with an undesirably high impedance, negatively affecting the current flowing through the load. If the voltage representing the current measurement must be reduced to match the required nominal feedback voltage of the switching integrated circuit, it may be reduced using a resistor divider network (not shown).

Alternatively, a DC bias may be added to the voltage representing the current measurement by a bias adjust element 426. As illustrated in FIG. 4, a DC to DC switcher 404 produces a current which flows along a load path. The load path comprises the electrical path from an output 408 of the DC to DC switcher 404 through an input 422 and output 424 of a load 420, terminating at a ground 456. The current sensor 440 produces a current measurement which leaves the measurement output 442 and enters an input 436 of a summer 432. A PWM current set point signal enters the input 452 of an integrator 450 where it is converted to a DC signal which travels from the output 454 of the integrator 450 to a second input 438 of the summer 432. The summer 432 calculates the difference between the two inputs 436 and 438 and places the resulting difference on output 434. This difference enters an input 430 of a bias adjust element 426 which raises or lowers the difference signal by a predetermined offset to make it conform to the required nominal feedback voltage of the DC to DC switcher 404. The adjusted feedback signal travels from the output 428 of the bias adjust element 426 to the feedback input 406 of the DC to DC switcher 404.

The bias adjust element 426 described above allows the designer to meet the feedback voltage requirements of the DC to DC switcher without requiring the modifications to the current sensor (e.g., 440) or the external current set point signal described above. In addition, the bias adjust element 426 magnifies the acceptable range of the current set point signal. With a bias adjust element 426, the current set point signal can differ widely from the desired output current level, and the bias adjust element can adjust the resulting difference to the required feedback voltage. The bias adjust element 426 also enables omni-directional control of the current level. If no external current set point is desired, the bias adjust element 426 may also operate to set the desired output current level.

Figure 5:
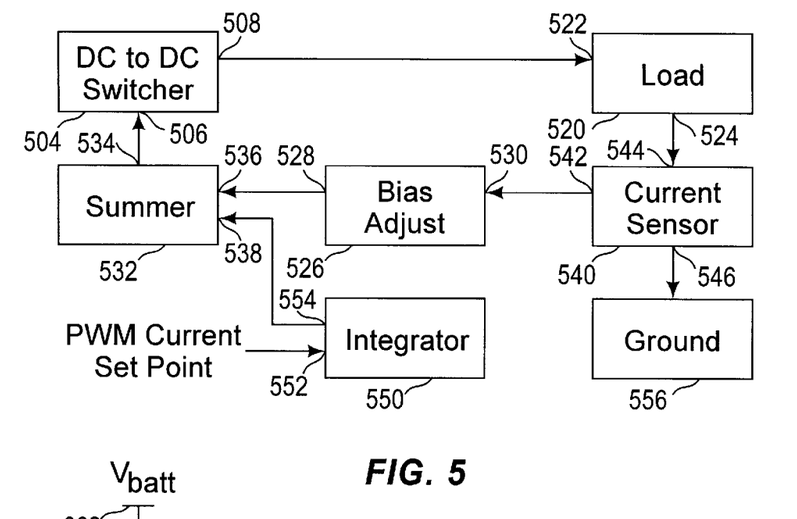
FIG. 5 is a block diagram illustrating an adjustable voltage controlled DC to DC switcher current source with a pulse width modulated current set point input and a bias adjust before the external current set point is added.

The bias adjust element 426 is shown above operating on the combined current measurement and current set point signal. Alternatively, the bias adjust element 526 could be placed before the summer 532 so as to operate only on the current measurement. As illustrated in FIG. 5, a DC to DC switcher 504 produces a current which flows from output 508 to a load 520. The current flows through the load 520 from the input 522 to the output 524, through a current sensor 540 from the input 544 to the output 546, then terminates at a ground 556. The current measurement leaves the current sensor 540 from the measurement output 542 and enters the input 530 of the bias adjust element 526 where a bias offset is added to the current measurement. The offset current measurement then leaves the output 528 of the bias adjust element 526 and enters an input 536 of the summer 532. A PWM current set point signal enters the input 552 of an integrator 550 where it is converted to a DC current set point signal, which travels from the output 554 of the integrator 550 and enters a second input 538 of the summer 532. The summer calculates the difference between its two inputs 536 and 538. This difference leaves the output 534 of the summer 532 and enters the feedback input 506 of the DC to DC switcher 504.

In this embodiment, as described above, the external current set point can differ widely from the desired output current. The current measurement is then offset by the bias adjust element 526 so that the difference calculated by the summer 532 corresponds to the required nominal feedback voltage of the DC to DC switcher 504.

Having generally described the adjustable DC to DC switcher constant current source, as well as some of its more significant features and advantages, some of the various embodiments will now be described in detail.

One embodiment of an adjustable DC to DC switcher constant current source is shown in the schematic in FIG. 6. In this schematic, the DC to DC switcher 604 is displayed in a boost topology. An inductor 664 is placed in series between a power source such as a battery 662 and a switching transistor 674. A current limiting resistor 678 is placed in series between the switching transistor 674 and ground to protect the inductor 664 from a current overload. The bottom end 668 of the inductor 664 feeds an output capacitor 676 and a load 620 through a rectifying diode 670. The output voltage or current is regulated by a switching integrated circuit 680 which controls the gate, or base, or the switching transistor 674 based on a feedback loop.

In a preferred embodiment, battery 662 may comprise two rechargeable nickel-cadmium batteries in series, with a voltage (Vbatt) in the range of about 1.8 volts DC to about 2.5 volts DC. Other elements of the DC to DC switcher 604 may have the following values:

| | |
|---|---|
| Inductor 664 | 10 μH |
| Rectifying diode 670 | Motorola Shottky Diode MBRS1100T |
| Output capacitor 676 | 100 μF, 10 VDC |
| Limiting resistor 678 | 100 mΩ |
| Switching transistor 674 | TEMIC S13443DV |
| Switcher IC 680 | Linear Technology, Inc. LT 1302 |

When the switching transistor 674 is on, a relatively huge current is drawn through the inductor 664, the switching transistor 674, and the current limiting resistor 678. The rectifying diode 670 is reverse-biased and the current ramps up through the inductor 664, storing energy therein. During this phase, the output current is supplied entirely by the output capacitor 676.

When the switching transistor 674 is off, the inductor 664 attempts to maintain the current previously flowing through it, through the switching transistor 674 to ground, using the energy stored in it by the flowing current. This stored energy is added to energy still flowing from the battery 662, passing through the rectifying diode 670 to recharge the output capacitor 676 and to supply the output current to the load 620.

When the output current drops below the desired level, the feedback loop carrying a measurement of the output current enters the feedback input 606 of the switching integrated circuit 680, which increases the on time of the switching transistor 674, drawing additional current from the battery 662 and increasing the energy stored in the inductor 664. When the output current rises above the desired level, the on time of the switching transistor 674 is decreased, cutting back on the current from the battery 662 and reducing the energy stored in the inductor 664.

The output current in this embodiment is measured using a precision low value current sensing resistor 690 placed in series between the load and ground 656. This current sensing resistor 690 preferably has a low resistance and a high enough power rating to handle the maximum output current. In a preferred embodiment, the current sensing resistor 690 may comprise a 2.2 Ω, 1 watt resistor.

The voltage at the positive end 688 of the current sensing resistor 690 represents the voltage drop across the current sensing resistor 690 (as the less positive end of the current sensing resistor 690 is tied to ground 656). This voltage at the positive end 688 (the current measurement) of the current sensing resistor 690 corresponds to the output current of the DC to DC switcher 604. It does not correspond to the output voltage of the DC to DC switcher 604 since the voltage drop across the load 620 is unknown. In one preferred embodiment, the output current through the load 620 is about 200 mA.

An external PWM current set point signal may be integrated in an integrating operational amplifier 650 which may comprise a Motorola MC 34074D general purpose operational amplifier. The integrating operational amplifier 650 produces a DC current set point signal which is a DC average of the PWM input.

The current measurement and the DC current set point signal are then fed into the two inputs of a summer, or differential amplifier 632, to determine whether to boost the output current or not. The summer's 632 output is proportionate to the difference between the two inputs. Therefore, when the current measurement signal is at the same voltage level as the DC current set point signal, the voltage difference between the two inputs is zero, and the output of the summer is at zero, or ground. This voltage representing the difference between the current measurement signal and the DC current set point signal may be referred to as the combined feedback voltage.

The summer 632 also operates as a low pass filter which reduces noise and provides a requisite time delay to eliminate hysterisis in the closed feedback loop. The time delays required in the adjustable voltage controlled DC to DC current source will be described in more detail below.

A DC bias may then be added to the combined feedback voltage to place it at the nominal feedback voltage required by the switching integrated circuit 680. For the LT 1302 switching integrated circuit 680 of a preferred embodiment, the nominal feedback voltage required is 1.2 volts DC. Therefore, when the current output from the DC to DC switcher is at the desired constant current level as set by the external current set point signal, the combined feedback voltage will be at 0 volts, and a DC bias of 1.2 volts should be added.

The combined feedback voltage produced by the summer 632 is fed into one of two inputs of a bias adjust operational amplifier 626 which may comprise a Motorola MC 34074D general purpose operational amplifier operating as a differential amplifier. A reference voltage, or bias voltage, is supplied to the second input of the bias adjust operational amplifier 626. This reference voltage may be produced by a voltage divider, or resistor divider network 694, comprising a supply voltage (Vbias) 682 connected to a first resistor 684 which is then connected to a second resistor 686 which terminates at a ground. The connection between the first resistor 684 and the second resistor 686 comprises the reference voltage connected to the second input of the bias adjust operational amplifier 626. In a preferred embodiment, the supply voltage Vbias 682 is at about 2 volts DC, the first resistor 684 may comprise a 300 kΩ ¼ watt resistor, and the second resistor 686 may comprise a 200 kΩ ¼ watt resistor. The reference voltage resulting from the resistor divider network of this preferred embodiment is 1.2 volts DC, equal to the required nominal feedback voltage of the LT 1302 switching integrated circuit 680.

When the current measurement voltage is equal to the current set point voltage, the summer 632 produces a combined feedback voltage of zero. The bias adjust operational amplifier 626 then calculates the difference between the combined feedback voltage of zero and the reference voltage of 1.2 volts DC, resulting in an output of 1.2 volts DC which is then fed into the feedback input 606 of the switching integrated circuit 680. Since the feedback voltage of 1.2 volts DC is equal to the required nominal feedback voltage of 1.2 volts DC for the LT 1302 switching integrated circuit 680, the output current is maintained at the constant level, rather than adjusting it up or down.

To obtain reliable control over the output current level, the time constants of the components in the system must be carefully chosen. A time constant refers to how quickly a component or group of components responds to changes at its input. A component with a fast (or small) time constant responds quickly to changes at its input, rapidly producing results at its output. A component with a slow (or large) time constant responds more slowly to changes at its input. A large time constant is therefore useful to filter noise out of a system, but if it is too large the system responds too slowly to provide adequate control.

If the time constants for the integrating operational amplifier 650 (T1), the summer 632 (T2) and the bias adjust operational amplifier 626 (T3) are properly chosen, the output current can be stabilized regardless of how disparate the time constants of the switching integrated circuit 680 and the remaining components of the DC to DC switcher 604 (e.g., 664, 674, 676). The time constant T3 of the bias adjust operational amplifier 626 should be greater than or equal to the time constant T2 of the summer 632 plus the time constant T1 of the integrating operational amplifier 650. This means that the bias adjust operational amplifier 626 is slower than the summer 632 and the integrating operational amplifier 650 working together, so that the bias adjust operational amplifier 626 can respond to the needs of the load. If T3 is not greater than or equal to T2+T1, the feedback loop will tend to become unstable. In addition, the time constant T1 of the integrating operational amplifier 650 should be greater than or equal to the time constant T2 of the summer 632. If T1 is not greater than or equal to T2, noise will be introduced into the feedback loop and a ripple will appear on the output current.

When the time constants are properly selected according to the criteria discussed above, the adjustable voltage controlled DC to DC switcher will be operating in a linear fashion and the switching integrated circuit 680 will be able to control the output current to minimize ripple.

It is important to note that the discrete components of an adjustable voltage controlled DC to DC switcher current source may comprise any components now known or that may be developed in the future which carry out substantially the same functions as the components discussed herein. Therefore, the present invention should not be regarded as limited to the components discussed herein. Furthermore, the functions discussed herein could be integrated in whole or in part into one or more integrated circuits without departing from the disclosed inventive concepts.

It is also important to note that other elements or circuits may be inserted into the disclosed circuit in various locations without departing from the disclosed inventive concepts. Thus, when an element is referred to as being connected to another element, it does not preclude a third, undisclosed element from being inserted between the two disclosed elements. Electrical circuits are often modified or supplemented to meet the diverse needs of the designer, and the adjustable DC to DC switcher current source may similarly be modified or supplemented as is common in the art without departing from the inventive concepts disclosed herein.

Figure 7:
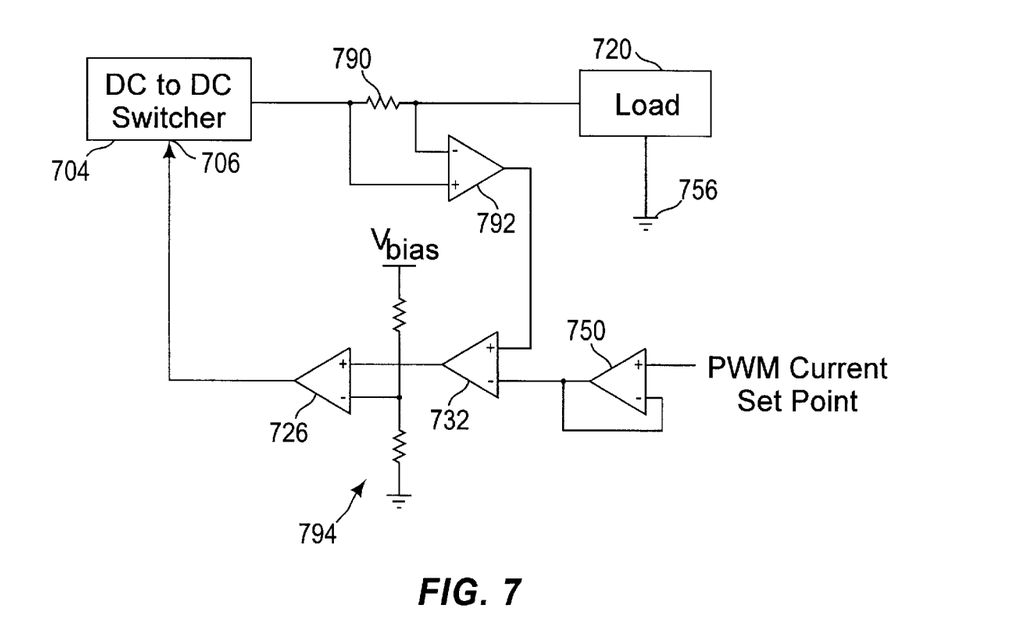
FIG. 7 is a schematic for an adjustable voltage controlled DC to DC switcher current source with a current sensing resistor above the load.

In another embodiment, FIG. 7 shows a schematic for an adjustable voltage controlled DC to DC switcher current source in which the load is grounded and the current senses the high line current, or the current before it enters the load. As explained above, the current is the same before and after flowing through the load, thus may be effectively measured either before or after the load.

High-line current sensing requires additional components, but it has the advantage that the load can be grounded outside the power supply rather than requiring a return line from the load for internal grounding.

As shown in FIG. 7, the output current flows from the DC to DC switcher 704 directly into a current sensing resistor 790, then through a load 720 before terminating at a ground 756 which may be external to the power supply. Since the current sensing resistor 790 does not terminate at ground as shown in FIG. 6, the voltage drop across it cannot be obtained directly as before. To measure the voltage drop across the current sensing resistor 790, a current measuring operational amplifier 792 is used to calculate the difference in the voltage levels between the input and the output of the current sensing resistor 790. This difference corresponds to the current measurement described above with respect to FIG. 6. A summer 732 combines the current measurement with a DC current set point signal, which may be obtained from a PWM current set point signal in an integrator 750 as described above. The combined feedback voltage from the summer 732 is fed into a bias adjust operational amplifier 726, where a DC bias from a resistor divider network 794 is added. The resulting feedback signal is then fed into the feedback input 706 of the DC to DC switcher 704.

In another embodiment illustrated in FIG. 8, a current sensor for an adjustable voltage controlled DC to DC switcher current source may use a current sensing winding comprising an inductively coupled transformer for sensing the load current. The use of a transformer for sensing current may be desirable when size and cost are not as important as imposing as little effect as possible on the output current.

In this embodiment, output current flows from a DC to DC switcher 804 through a load 820, then through a transformer 896 before terminating at a ground 856. The transformer 896 comprises two separate electrical wires (or windings) adjacent one another. As output current flows through the first winding, a proportionate current is induced in the second winding. However, to induce a current in one winding, there must be a changing, or alternating, current in the second. Therefore, an oscillator 898 is connected between the input of the second electrical winding and ground to supply an alternating current in the second winding. As a result, a current proportionate to the output current is added to the alternating current in the second winding produced by the oscillator 898.

This has the benefit of isolating the feedback circuit from the load path in high noise applications and eliminates the power drop across a current sensing resistor (e.g., 690).

The resulting current measurement from the transformer 896 is combined in a summer 832 with a DC current set point signal, which may be obtained from a PWM current set point signal in an integrator 850 as described above. The combined feedback voltage from the summer 832 is fed into a bias adjust operational amplifier 826, where a DC bias from a resistor divider network 894 is added. The resulting feedback signal is then fed into the feedback input 806 of the DC to DC switcher 804. With the summer 832 acting as a low pass filter or integrator, the oscillating current from the oscillator 898 will be filtered out, effectively operating only on the DC biases from the integrator 850 and the current measurement from the transformer 896.

FIG. 9 illustrates another embodiment for sensing the current in the load path while minimizing the effect on the output current. In this embodiment, a current sensing winding comprises a Hall-effect device 998 for sensing the load current. A Hall-effect device 998 inductively couples to a magnetic field produced by a current-carrying conductor to produce a proportionate current in the winding of the device 998.

In this embodiment, output current flows from a DC to DC switcher 904 through a load 920, then through the Hall-effect device 998 before terminating at a ground 956. Minimal power is lost to the Hall-effect device 998 since the output current is not physically flowing through the windings of the Hall-effect device 998. Rather, it is simply flowing through a conductor or wire that passes adjacent the Hall-effect device 998. One side of the Hall-effect device 998 winding passes through a resistor 999 to ground, while the other carries the current measurement to a summer 932.

The resulting current measurement from the Hall-effect device 998 is combined in the summer 932 with a DC current set point signal, which may be obtained from a PWM current set point signal in an integrator 950 as described above. The combined feedback voltage from the summer 932 is fed into a bias adjust operational amplifier 926, where a DC bias from a resistor divider network 994 is added. The resulting feedback signal is then fed into the feedback input 906 of the DC to DC switcher 904.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A voltage controlled current source for supplying a selectable constant current to a load, comprising:
   a DC to DC switcher comprising a feedback input and a constant current output for supplying a constant current to the load;
   one or more current sensing resistors coupled to said constant current output; and
   an electrical coupling between at least one of said current sensing resistors and said feedback input.

2. The voltage controlled current source of claim 1, wherein one or more of said current sensing resistors are connected in series with a load path which may be coupled with said constant current output.

3. The voltage controlled current source of claim 1, wherein said voltage controlled current source operates in a linear fashion.

4. The voltage controlled current source of claim 1, wherein said DC to DC switcher is configured in a boost topology.

5. The voltage controlled current source of claim 1, wherein said DC to DC switcher is configured in a buck topology.

6. The voltage controlled current source of claim 1, wherein said DC to DC switcher is configured in a boost/buck topology.

7. The voltage controlled current source of claim 1, wherein said electrical coupling comprises a bias adjust operational amplifier for adjusting a DC bias on said electrical coupling, said bias adjust operational amplifier having a first input, a second input, and an output, said first input for receiving said signal sensed by at least one of said one or more current sensing resistors, the second input for receiving a bias voltage, said output being connected to the feedback input of said DC to DC switcher.

8. The voltage controlled current source of claim 1, wherein said electrical coupling comprises a summer operational amplifier for combining an external current set point signal with a signal sensed by at least one of said one or more current sensing resistors, having a first input, a second input, and an output, said first input for receiving said signal sensed by at least one of said one or more current sensing resistors, the second input for receiving said external current set point signal, said output being connected to the feedback input of said DC to DC switcher.

9. The voltage controlled current source of claim 8, wherein said external current set point signal is a pulse width modulated signal, further comprising an integrator operational amplifier for receiving and integrating the pulse width modulated signal to generate a corresponding DC signal, said integrator having a first input, a second input, and an output, said first input for receiving said external current set point signal, said second input being connected to said output, and said output being connected to the first input of said summer operational amplifier.

10. The voltage controlled current source of claim 1, further comprising an integrator operational amplifier for integrating a pulse width modulated current set point signal into a DC signal, and wherein said electrical coupling comprises:
   a summer operational amplifier comprising a first input coupled to at least one of said current sensing resistors, a second input coupled to an output of said integrator operational amplifier; and
   a bias adjust operational amplifier comprising an input coupled to an output of said summer operational amplifier and an output connected to said feedback input of said DC to DC switcher for adjusting a DC bias on said electrical coupling.

11. The voltage controlled current source of claim 10, wherein said integrator operational amplifier has a first time constant, said summer operational amplifier has a second time constant, and said bias adjust operational amplifier has a third time constant, and wherein said third time constant is greater than or equal to said first time constant plus said second time constant.

12. The voltage controlled current source of claim 11, wherein said first time constant is greater than or equal to said second time constant.

13. The voltage controlled current source of claim 1, further comprising an integrator operational amplifier for integrating a pulse width modulated current set point signal into a DC signal, and wherein said electrical coupling comprises:
   a bias adjust operational amplifier having a first input, a second input, and an output, said first input for receiving a signal sensed by at least one of said one or more current sensing resistors, the second input for receiving a bias voltage; and
   a summer operational amplifier comprising a first input, a second input, and an output, said first input for receiving the output of said bias adjust operational amplifier, said second input for receiving said DC signal, and said output being connected to the feedback input of said DC to DC switcher.

14. A voltage controlled current source for supplying a selectable constant current to a load, comprising:

a DC to DC switcher comprising a feedback input and a constant current output for supplying a constant current to the load;

one or more current sensing windings inductively coupled to said current output; and an electrical coupling between at least one of said current sensing windings and said feedback input.

15. The voltage controlled current source of claim 14, wherein said current sensing windings comprise a Hall-effect device.

16. The voltage controlled current source of claim 14, wherein said current sensing windings comprise a transformer.

17. A method of supplying a constant current using a voltage controlled DC to DC switcher, comprising:

a) measuring an output current from the voltage controlled DC to DC switcher as a current indicating voltage; and b) feeding said current indicating voltage into a feedback input on said voltage controlled DC to DC switcher to maintain the output current at a constant level.

18. The method of claim 17, further comprising combining a current set point signal with said current indicating voltage before feeding said current indicating voltage into said feedback input.

19. The method of claim 18, further comprising adding a bias voltage to said current indicating voltage before feeding said current indicating voltage into said feedback input.

* * * * *

UNITED STATES PATENT AND TRADEMARK OFFICE
CERTIFICATE OF CORRECTION

PATENT NO.   : 6,150,802
DATED        : November 21, 2000
INVENTOR(S)  : Michael Andrews It is certified that error appears in the above-identified patent and that said Letters Patent is hereby corrected as shown below:

<u>Column 5,</u>
Lines 7-9, delete "It is often desirable to have the ability to externally adjust the current level from the DC to DC switcher 304." and insert therefor -- It is often desirable to have the ability to externally adjust or select the current level from the DC to DC switcher 304, thereby providing a constant and controllably adjustable current source, which may also be referred to as a selectable constant current source. --

Signed and Sealed this

Eighth Day of October, 2002

*Attest:*

*Attesting Officer*

JAMES E. ROGAN
*Director of the United States Patent and Trademark Office*